United States Patent [19]

Blizzard et al.

[11] 4,310,678

[45] Jan. 12, 1982

[54] LIQUID COPOLYMERIC ORGANOPOLYSILOXANES COMPRISING $SiO_2$ AND METHOD THEREFOR

[75] Inventors: John D. Blizzard, Bay City; Terence J. Swihart, Essexville, both of Mich.

[73] Assignee: Dow Corning Corporation, Midland, Mich.

[21] Appl. No.: 212,188

[22] Filed: Dec. 2, 1980

[51] Int. Cl.$^3$ .............................................. C07F 7/08
[52] U.S. Cl. .................................................... 556/451
[58] Field of Search ........................................ 556/451

[56] References Cited

U.S. PATENT DOCUMENTS

| | | | |
|---|---|---|---|
| 2,676,182 | 4/1954 | Daudt et al. | 260/448.2 |
| 2,814,601 | 11/1957 | Currie et al. | 556/451 X |
| 3,205,283 | 9/1965 | Modic | 260/825 |
| 3,627,851 | 12/1971 | Brady | 260/825 |
| 3,772,247 | 11/1973 | Flannigan | 260/46.5 H |
| 3,992,426 | 11/1976 | Johnson et al. | 556/451 |

*Primary Examiner*—Paul F. Shaver
*Attorney, Agent, or Firm*—George A. Grindahl

[57] ABSTRACT

Copolymeric organopolysiloxanes comprising $SiO_2$ are prepared by forming an acidic, homogeneous mixture of a silanol-containing resinous copolymeric siloxane comprising $R_3SiO_{\frac{1}{2}}$ siloxane units and $SiO_2$ siloxane units, an organohydrogenpolysiloxane and an organic solvent and heating the resulting mixture to remove substantially all of the organic solvent. The copolymeric organosiloxanes contain silicon-bonded hydroxyl radicals and/or silicon-bonded hydrogen radicals in varying amounts which depends upon the acidity of the homogeneous mixture that is formed and the ratio of silicon-bonded hydrogen radicals to silicon-bonded hydroxyl radicals therein. The copolymeric organopolysiloxanes are useful as a reactive component in various types of curable silicone compositions.

12 Claims, 1 Drawing Figure

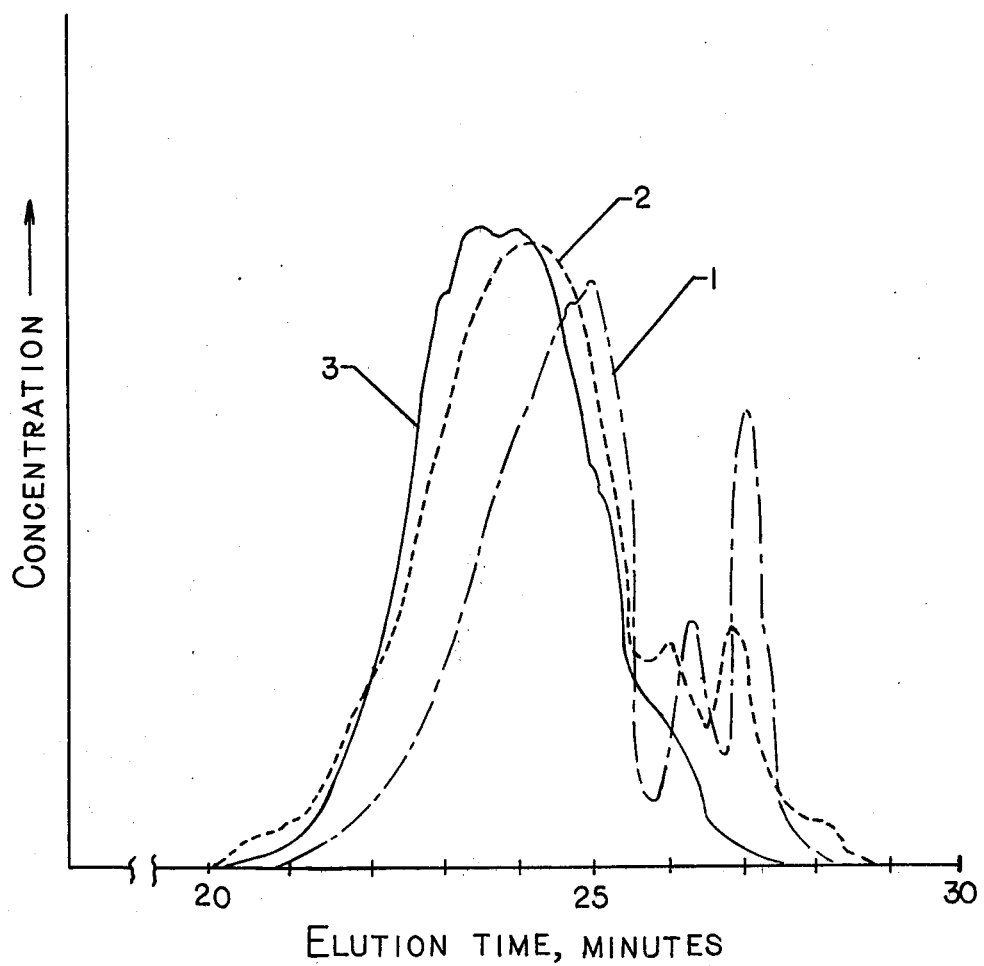

LIQUID COPOLYMERIC ORGANOPOLYSILOXANES COMPRISING SiO$_2$ AND METHOD THEREFOR

BACKGROUND OF THE INVENTION

The present invention relates to copolymeric organopolysiloxanes comprising SiO$_2$ and to a method for their preparation. More particularly the present invention relates to the preparation of liquid copolymeric organopolysiloxanes comprising SiO$_2$. In a preferred embodiment the present invention relates to the preparation of liquid copolymeric organopolysiloxanes comprising SiO$_2$ and bearing silicon-bonded hydroxyl radicals and silicon-bonded hydrogen radicals.

Copolymeric siloxanes comprising SiO$_2$ have been disclosed by Daudt et al., U.S. Pat. No. 2,676,182 which are prepared by reacting a silica hydrosol having a pH of less than 5 with an organosilane having the formula R$_n$SiX$_{4-n}$ or an organosiloxane having the formula R$_n$SiO$_{(4-n)/2}$ wherein R is alkyl, monocyclic aryl or halogenated monocyclic aryl and X is chlorine or alkoxy. The reaction products are said to range from viscous oils to thermoplastic resins. Some of the copolymeric siloxanes of Daudt et al. are preferred starting materials for the process of this invention.

Organopolysiloxane resins containing R$_3$SiO$_{1/2}$ units and SiO$_2$ units, along with RHSiO units and/or HSiO$_{3/2}$ units, wherein R is a monovalent hydrocarbon group, are disclosed by Flannigan, U.S. Pat. No. 3,722,247. The resins of Flannigan are said to be preparable in any one of a variety of ways; however, cohydrolysis of hydrolyzable silanes and the reaction of hydrolyzable silanes with a silica hydrosol are the only methods disclosed and only brittle, solid resins are disclosed.

Solventless, flowable organopolysiloxane encapsulating fluids comprising SiO$_2$ are disclosed by Modic, U.S. Pat. No. 3,205,283 which are prepared by heating a homogeneous mixture of an organic solvent solution of a resinous copolymer containing R$_3$SiO$_{1/2}$ units, wherein R is a monovalent hydrocarbon radical, and SiO$_2$ units and a liquid silanol chain-stopped diorganopolysiloxane to remove the organic solvent therefrom.

Brady, U.S. Pat. No. 3,627,851 discloses benzene-soluble copolymeric siloxanes consisting of (CH$_3$)$_3$SiO$_{1/2}$ units, (CH$_3$)$_2$HSiO$_{1/2}$ units and SiO$_2$ units which are prepared by modifying the procedure of Daudt et al. noted above to include (CH$_3$)$_2$HSiCl or (CH$_3$)$_2$HSiOSiH(CH$_3$)$_2$ as one of the components to react with the acidic silica hydrosol.

SUMMARY OF THE INVENTION

It is an object of this invention to provide a method for preparing liquid copolymeric organopolysiloxanes comprising SiO$_2$. It is a particular object of this invention to provide liquid copolymeric organopolysiloxanes comprising SiO$_2$ and bearing silicon-bonded hydroxyl radicals and silicon-bonded hydrogen radicals.

These objects, and others which will be obvious to one skilled in the organopolysiloxane art upon considering the following disclosure and appended claims, are obtained by the method of this invention comprising (A) forming a homogeneous mixture having an acid number greater than zero and comprising (a) an organic solvent solution of a resinous copolymeric siloxane containing silicon-bonded hydroxyl radicals and consisting essentially of R$_3$SiO$_{1/2}$ siloxane units and SiO$_{4/2}$ siloxane units wherein the ratio of the number of said R$_3$SiO$_{1/2}$ siloxane units to the number of said SiO$_{4/2}$ siloxane units has a value of from 0.6/1 to 0.9/1 and each R denotes, independently, a monovalent hydrocarbon radical, and (b) a liquid organohydrogenpolysiloxane wherein each organic radical is, independently, a monovalent hydrocarbon radical, there being an average of at least one silicon-bonded hydrogen radical per molecular of said organohydrogenpolysiloxane, and (B) heating said homogeneous mixture to remove substantially all of said organic solvent therefrom.

BRIEF DESCRIPTION OF THE DRAWING

The sole drawing is a composite of three gel-permeation chromatograms. Curve 1 is a chromatogram of a xylene solution of a resinous copolymer siloxane consisting of (CH$_3$)$_3$SiO$_{1/2}$ siloxane units and SiO$_{4/2}$ siloxane units and having a silicon-bonded hydroxyl content of about 3.66 percent by weight, the ratio of (CH$_3$)$_3$SiO$_{1/2}$ units to SiO$_{4/2}$ units having a value of about 0.75. Curve 2 is a chromatogram of a mixture of 60 parts by weight of the composition represented by Curve 1 and 40 parts by weight of a liquid organohydrogenpolysiloxane having the formula (CH$_3$)$_3$SiO{(CH$_3$)(H)SiO}$_{35}$Si(CH$_3$)$_3$. Curve 3 is a chromatogram of a composition of this invention obtained by heating the mixture represented by Curve 2 according to the process of this invention. The material having an elution time exceeding 26 minutes in Curves 1 and 2 is substantially silanol-free volatile material which may have simply been removed from the composition represented by Curve 3 during the heating and solvent removal process. Specifically the material eluting at approximately 26 minutes and 27 minutes is {(CH$_3$)$_3$SiO}$_4$O and {(CH$_3$)$_2$SiO}$_4$, respectively.

DETAILED DESCRIPTION OF THE INVENTION

The products of the process of this invention are designated herein as copolymeric organopolysiloxanes. They are prepared by reacting, by the process of this invention, a first reactant, designated herein as a resinous copolymeric siloxane, with a second reactant, designated herein as a liquid organohydrogenpolysiloxane.

The products of the process of this invention have a structure which is not completely known at this time; however, their copolymeric nature is revealed by the sole drawing which shows a gel-permeation chromatogram (Curve 3), which is displaced and different from the gel-permeation chromatogram for the mixture of starting materials (Curve 2), when measured under identical instrumental conditions. Under identical gel-permeation chromatography instrumental conditions larger molecules have a shorter elution time than smaller molecules; therefore, a larger portion of the copolymeric organopolysiloxane of this invention has larger molecular size than either of its precursors.

Component (a) that is used in the method of this invention is an organic solvent solution of a resinous copolymeric siloxane which consists essentially of R$_3$SiO$_{1/2}$ siloxane units and SiO$_{4/2}$ siloxane units. The resinous copolymer siloxane has a complex, as-yet-undetermined structure; however, for the purposes of this disclosure it is fully characterized by the ratio of said siloxane units therein, by its silanol, i.e. silicon-bonded hydroxyl, content and by its solubility in organic solvents, such as benzene.

The resinous copolymeric siloxane portion of component (a) consists of from 0.6 to 0.9 $R_3SiO_{1/2}$ units for every $SiO_{4/2}$ unit. Each R denotes a monovalent hydrocarbon radical, such as an alkyl radical, such as methyl, ethyl, isopropyl, butyl and hexyl; an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl, cyclohexyl and cyclohexenyl. Preferably all R radicals in component (a) are lower alkyl radicals although a minor portion of them can be replaced with other monovalent hydrocarbon radicals such as the vinyl radical and/or the phenyl radical to provide additional properties for the resinous copolymer such as the reactivity attendent therewith. The resinous copolymeric siloxane portion further comprises from 0.1 to 5 percent by weight of silicon-bonded hydroxyl radicals and frequently comprises trace amounts of silicon-bonded alkoxy radicals such as methoxy, ethoxy or isopropoxy radicals which arise from the particular method that is used to prepare said resin copolymeric siloxane.

In a preferred embodiment of this invention the resinous copolymeric siloxane portion of component (a) consists essentially of $(CH_3)_3SiO_{1/2}$ siloxane units and $SiO_{4/2}$ siloxane units, in the number ratio stated above, and has a silicon-bonded hydroxyl content of from 1 to 5 percent by weight.

Resinous copolymeric siloxanes consisting of $R_3SiO_{1/2}$ units and $SiO_{4/2}$ units are well known in the art and are described by Daudt et al., U.S. Pat. No. 2,676,182, and by Goodwin, U.S. Pat. No. 2,857,356, the disclosures of which are hereby incorporated herein by reference to teach how to prepare resinous copolymeric siloxanes which are suitable for use in the method of this invention. Briefly, in these methods, an aqueous solution of sodium silicate (e.g. No. 9 sodium silicate sold by DuPont ®) is acidified to the proper pH by adding it to a mixture of hydrochloric acid and isopropanol and the resulting acidic silica hydrosol is then treated with a source of $R_3SiO_{1/2}$ siloxane units such as $R_3SiOCH_3$, $R_3SiCl$ or $R_3SiOSiR_3$ dissolved in a mixture of isopropanol and xylene. After being heated the reaction mixture is cooled and is separated into an aqueous phase, which is discarded, and a non-aqueous phase comprising the resinous copolymeric siloxane, which is further washed with water to reduce its acid number and to remove water-soluble components, such as isopropyl alcohol. Preferably the acidic resinous copolymeric siloxanes which are prepared by these methods are washed with water to remove most, but not all, of the acid therein. For example, resinous copolymeric siloxanes which have been prepared by the method of Daudt et al. typically have sufficient acid remaining therein to provide an acid number of from 0.2 to 2.0, as measured by the method hereinafter disclosed, based on the solvent-free resinous copolymeric siloxane. These materials are preferred.

Resinous copolymeric siloxanes are typically prepared in an organic solvent which can conveniently serve as the organic solvent portion of component (a) in the method of this invention. Alternatively, the resinous copolymeric siloxane can be prepared in one organic solvent and subsequently can be transferred to a second organic solvent, if desired, to form component (a) for the method of this invention. If the resinous copolymeric siloxane does not contain any organic solvent, one or more organic solvents should be mixed therewith before or during preparation of homogeneous mixture to be heated.

The particular organic solvent portion of component (a) is not critical and can be for example an aliphatic hydrocarbon, an aromatic hydrocarbon or halogenated derivatives of either or mixtures thereof. Preferably the organic solvent is one that forms an azeotrope with water so that any water is formed during the heating step in the method of this invention can be conveniently removed by azeotropic distillation. Particularly useful organic solvents include benzene, toluene, xylene, trichloroethylene and mineral spirits.

The amount of resinous copolymeric siloxane contained in component (a) is not critical and can range from 10 to 90 percent by weight. It is preferred that only as much organic solvent as is needed to prepare a homogeneous mixture of resinous copolymeric siloxane and liquid organohydrogenpolysiloxane be used in order to minimize the amount of time and/or energy needed to subsequently remove it from the mixture as described hereinafter. A preferred component (a) contains approximately 60 to 70 percent by weight resinous copolymeric siloxane and the balance solvent.

Component (b) is any liquid organohydrogenpolysiloxane containing an average of at least one silicon-bonded hydrogen radical per molecule, and can have a linear, cyclic or branched structure or combinations thereof. Thus, component (b) has the unit formula $R'_mH_nSiO_{(4-m-n)/2}$ wherein m and n denote positive numbers whose sum is less than 4, preferably from 1.9 to 2.1. The organic radicals (R') in component (b) can be any of the R radicals denoted above. Preferably, although not necessarily, the organic radicals (R') in component (b) are the same as the organic radicals (R) in component (a).

Examples of organohydrogenpolysiloxanes that are suitable for use as component (b) in the process of this invention include cyclic organohydrogenpolysiloxanes of the unit formula $R'_mH_{2-m}SiO$ such as $\{(CH_3)(H)SiO\}_x$ wherein x is 3, 4, 5, 6 and higher and $\{(CH_3)(H)SiO\}_y\{(CH_3)_2SiO\}_z$ wherein the sum of y plus z is 3, 4, 5, 6 and higher; and linear organohydrogenpolysiloxanes of the formula $R''R'_2SiO(R'_2SiO)_a(R'HSiO)_bSiR'_2R''$, such as $R''(CH_3)_2SiO\{(CH_3)_2SiO\}_a\{(CH_3)(H)SiO\}_b$-$Si(CH_3)_2R''$ wherein R'' denotes H or methyl and a and b each denote zero or a number greater than zero, provided there is at least one silicon-bonded hydrogen radical per molecule, such as $H(CH_3)_2SiO\{(CH_3)_2SiO\}_aSi(CH_3)_2H$, $(CH_3)_3SiO\{(CH_3)(H)SiO\}_bSi(CH_3)_3$, $(CH_3)_3SiO\{(CH_3)(H)SiO\}_b\{(CH_3)_2SiO\}_aSi(CH_3)_3$ and $H(CH_3)_2SiO\{CH_3)_2SiO\}_a\{(CH_3)(H)SiO\}_bSi(CH_3)_2H$.

An organohydrogenpolysiloxane having the formula $(CH_3)_3SiO\{(CH_3)(H)SiO\}_bSi(CH_3)_3$ wherein b has an average value of from 30 to 70 is a highly preferred component (b) in the process of this invention, particularly when it is desired that the product of this invention have relatively large amounts of silicon-bonded hydrogen radicals.

Liquid organohydrogenpolysiloxane (b) can have any viscosity; however, it preferably has a viscosity of less than 1 pascal-second at 25° C. when used in amounts of less than 60 parts by weight for every 40 parts by weight of resinous copolymeric siloxane.

Organohydrogenpolysiloxanes and their preparation are well known in the organosilicon polymer art; some are commercially available. Briefly the preparation of organohydrogenpolysiloxanes can be accomplished in any suitable manner such as by hydrolyzing a mixture of suitable hydrolyzable silanes, such as chlorosilanes, and equilibrating the resulting hydrolyzate under acid catalysis. Alternatively, a mixture of suitable siloxanes, such as cyclic siloxanes and linear siloxanes, can be copolymerized and equilibrated under acid catalysis.

In the method of this invention the amounts of resinous copolymeric siloxane and liquid organohydrogenpolysiloxane that are mixed may vary widely. Generally, the viscosity of the copolymeric organopolysiloxane that is produced by the method of this invention varies directly with the viscosity of the organohydrogenpolysiloxane and inversely with its weight percent in the homogeneous mixture of components (a) and (b). Liquid copolymeric organopolysiloxanes can be obtained when as little as about 10 percent by weight of organohydrogenpolysiloxane is used, based on the weight of resinous copolymeric siloxane plus organohydrogenpolysiloxane. Liquid copolymeric organopolysiloxanes of this invention which contain less than about 10 percent by weight of resinous copolymeric siloxane component are not expected to significantly demonstrate the benefits for which the resinous copolymeric siloxane is used, such as a strengthening component in curable silicone compositions.

A highly preferred composition of this invention is obtained when the homogeneous mixture that is heated in the process of this invention comprises from 40 to 60 parts by weight of resinous copolymeric siloxane consisting of $(CH_3)_3SiO_{1/2}$ units and $SiO_{4/2}$ units and containing from 1 to 5 percent by weight of silicon-bonded hydroxyl radicals and from 40 to 60 parts by weight of organohydrogenpolysiloxane having the formula $(CH_3)_3SiO\{(CH_3)(H)SiO\}_{30 \text{ to } 70}Si(CH_3)_3$. The resulting copolymeric organopolysiloxanes have demonstrated unexpected utility as a controlled release additive for curable silicone coating compositions, as disclosed in an application for U.S. patent by J. D. Blizzard, titled "Curable Silicone Compositions Comprising Liquid Resin and Use thereof" and filed simultaneously herewith. Said Blizzard application is hereby incorporated herein by reference to show the utility of the compositions of this invention.

In the method of this invention a homogeneous mixture is formed by thoroughly mixing the desired amounts of component (a) and component (b) and, if necessary, an acid, preferably a strong acid such as hydrochloric acid, to provide an acid number greater than zero therefor. Preferably the acid number of the homogeneous mixture, extrapolated to zero solvent content, has a value of from 0.1 to 1. Preferably component (a) is sufficiently acidic, as prepared, to provide this acidity for the homogeneous mixture.

The resulting homogeneous mixture is immediately or subsequently heated to volatilize the organic solvent therefrom. Said heating is preferably initially done at atmospheric pressure and is then continued at reduced pressure to accelerate the removal of said solvent.

In a preferred embodiment of this invention the homogeneous mixture of (a) plus (b) is heated to about 150° C. at atmospheric pressure and is then subjected to a gradually decreasing pressure, without an increase in temperature, to remove substantially all of the organic solvent therefrom. By substantially it is meant herein that the product of this invention contains less than about 5 percent, and preferably less than about 1 percent, by weight organic solvent.

Alternatively, the homogeneous mixture can be partially devolatilized at room temperature, such as by evaporation, and the partially devolatilized mixture then heated to remove substantially all of the organic solvent therefrom.

While not wishing to be limited by theory we believe that the copolymeric organopolysiloxanes of this invention are formed by a reaction between the resinous copolymeric siloxane and the organohydrogenpolysiloxane to form by-product water and/or by-product hydrogen. The heating step of the process of this invention serves not only to remove substantially all of the organic solvent from the homogeneous mixture of reactants but also to facilitate said reaction. Said reaction is also facilitated by the acid in the homogeneous mixture, greater reaction being obtained in mixtures having a higher acid number.

The copolymeric organopolysiloxanes that are produced by the method of this invention contain silicon-bonded hydroxyl radicals and/or silicon-bonded hydrogen radicals which provide chemical reactivity therefor. The amount of silicon-bonded hydrogen radicals and/or silicon-bonded hydroxyl radicals therein depends upon the ratio of said radicals in, and the acid number of, the homogeneous mixture that is used for its preparation.

To assure that the copolymeric organopolysiloxane that is prepared by the method of this invention contains silicon-bonded hydrogen radicals it is believed that the homogeneous mixture that is prepared should have at least 2, and preferably at least 3, silicon-bonded hydrogen radicals for every silicon-bonded hydroxyl radical. An upper limit of 2580 for the ratio of silicon-bonded hydrogen radicals to silicon-bonded hydroxyl radicals in the homogeneous mixture occurs in a mixture of 10 parts by weight of resinous copolymeric siloxane having a silanol content of 0.1 percent by weight and 90 parts by weight of an organohydrogenpolysiloxane having a silicon-bonded hydrogen content of 1.7 percent by weight.

To assure that the copolymeric organopolysiloxane that is prepared by the method of this invention contains silicon-bonded hydroxyl radicals it is believed that the acid number of the homogeneous mixture that is heated should have a value of less than about 2.

The copolymeric organopolysiloxanes of this invention are useful per se as tin-catalyzed or platinum-catalyzed curable encapsulating compositions. They have also been found to be useful as a reactive component in curable silicone compositions such as in silicone coating compositions comprising hydroxyl-containing silicone fluid polymers or vinyl-containing silicone fluid polymers.

The following examples are disclosed to further illustrate, but not limit, the present invention. All parts and percentages are by weight unless otherwise stated.

The non-volatile content, also denoted herein as N.V.C., of a material was determined by placing 1.50 grams of the material in an aluminum foil dish, 60 mm. in diameter and 15 mm. deep and heating the sample for 1 hour at 150° C. in an air-circulating oven. The heated sample was then cooled to room temperature and re-weighed to determine the weight of the non-volatile material (w). N.V.C., in percent, is equal to 100 w/1.50.

The acid number, also denoted herein as A.N., of a material was determined by titrating 1.00 grams of the material to a bromcresol purple endpoint, using alcoholic KOH, and is equal to the number of mg. of KOH so used.

The viscosity of a material was measured at 25° C. with a Brookfield ® viscometer Model RVF and the value obtained was converted from centipoise to pascal-seconds (Pa·s) for this disclosure by multiplying by 0.001.

The following components were used in the examples.

Resin A-1

A xylene solution of a resinous copolymeric siloxane, prepared from 45 parts of sodium silicate (41.6° Be) and 20 parts of $(CH_3)_3SiCl$ according to the method of Daudt et al. noted above, containing $(CH_3)_3SiO_{1/2}$ siloxane units and $SiO_{4/2}$ siloxane units of approximately 0.75/1.0 and having A.N.=0.80, SiOH=2.56%, SiH=0% and N.V.C.=70%. By extrapolation to 100% N.V.C. the resinous copolymeric siloxane itself had A.N.=1.14, SiH=0% and SiOH=3.66%.

Resin A-2

Resin A-1 with substantially all of its solvent removed by evaporation at room temperature and atmospheric pressure to N.V.C.=95%; a solid material.

Resin A-3

Similar to, and prepared as, Resin A-1 except having N.V.C.=67.35%, A.N.=0.64, SiH=0.003% and SiOH=1.91%. By extrapolation to 100% N.V.C. the resinous copolymeric siloxane had A.N.=0.95, SiH=0.004% and SiOH=2.84%.

Resin A-4

Similar to, and prepared as, Resin A-1 except having N.V.C.=68.7%, A.N.=0.33, SiH=0% and SiOH=2.02%. By extrapolation to 100% N.V.C. the resinous copolymeric siloxane had A.N.=0.48, SiH=0% and SiOH=2.94%.

Resin A-5

Similar to, and prepared as, Resin A-1 except having an N.V.C.=67.6%, A.N.=1.12 and a Turbidity Index=12.4 (an indirect measurement of SiOH). By extrapolation to 100% N.V.C. the resinous copolymer siloxane had A.N.=1.66.

Fluid B-1

An organohydrogenpolysiloxane liquid having the formula $(CH_3)_3SiO\{(CH_3)_2SiO\}_3\{(CH_3)(H)SiO\}_5Si(CH_3)_3$, N.V.C.=100%, A.N.=0.005, SiH=0.74% and SiOH=0.025%.

Fluid B-2

An organohydrogenpolysiloxane liquid having the formula $(CH_3)_3SiO\{(Ch_3)(H)SiO\}_{35}Si(CH_3)_3$, N.V.C.=100%, A.N.=0.01, SiH=1.96%, SiOH=0% and a viscosity of 0.03 Pa·s.

Fluid B-3

Same as Fluid B-2 except having A.N.=0.02, SiOH=0% and SiH=1.71%.

Fluid B-4

Same as Fluid B-2 except having A.N.=0.008, SiOH=0.03% and SiH=1.56%.

EXAMPLE 1

This example illustrates the preparation of a composition of this invention at atmospheric pressure.

Forty parts of Fluid B-3 and 85.7 parts of Resin A-1 (60 parts of resinous copolymeric siloxane and 25.7 parts of xylene) were mixed to form a homogeneous mixture having 5.3 silicon-bonded hydrogen radicals for every silicon-bonded hydroxyl radical. The mixture was devolatilized at room temperature and atmospheric pressure to a N.V.C.=97%. This devolatilized, but not heated, mixture had SiOH=3.82%, SiH=0.35%, A.N.=0.19 and a viscosity of 900 Pa·s. The devolatilized mixture was heated at 150° C. for 2 hours in an air-circulating oven. The resulting liquid composition of this invention had SiOH=0.48%, SiH=0.56% and A.N.=0.22. It was useful as a controlled release additive in a solventless silicone coating composition.

When this example was repeated with solid Resin A-2 a small percentage of the resin could not be homogeneously mixed with Fluid B-3. When this heterogeneous mixture having SiOH=2.09%, SiH=0.67%, A.N.=0.08, N.V.C.=97% and a viscosity of 38.5 Pa·s was heated, as above, a liquid composition having SiOH=0.35%, SiH=0.64% and A.N.=0.08 was obtained which provided substantially the same controlled adhesive release for a solventless silicone coating composition as the above solvent-prepared composition.

EXAMPLE 2

This example illustrates the preparation of a composition of this invention at reduced pressure.

Forty parts of Fluid B-3 and 85.7 parts of Resin A-1 were mixed to form a homogeneous mixture which was heated to 150° C. at atmospheric pressure after which the pressure was reduced sufficiently to volatilize xylene and water. After water ceased to be evolved the mixture was heated at 150° C. at a pressure of 2 Torr (267 Pa) to remove substantially all of the remaining xylene. The copolymeric organopolysiloxane of this invention had SiOH=1.98%, SiH=0.15%, A.N.=9.35 and a viscosity of 250 Pa·s. It was useful as a controlled-release additive in a curable silicone paper-coating composition.

EXAMPLE 3

The preparation described in Example 2 was repeated except that 60 parts of Fluid B-3 and 57.1 parts of the Resin A-1 (40 parts of resinous copolymeric siloxane and 17.1 parts of xylene) were mixed to form a homogeneous mixture having 11.8 silicon-bonded hydrogen radicals for every silicon-bonded hydroxyl radical. The resulting copolymeric organopolysiloxane of this invention had SiOH=0.87%, SiH=0.91%, A.N.=0.10 and a viscosity of 0.31 Pa·s. It was useful as a reinforcing component in a curable aqueous silicone emulsion composition.

EXAMPLE 4

The preparation described in Example 2 was repeated except that 40 parts of Fluid B-2 and 87.3 parts of Resin A-4 (60 parts of resinous copolymeric siloxane and 27.3 parts of xylene) were mixed to form a homogeneous mixture having 7.6 silicon-bonded hydrogen radicals for every silicon-bonded hydroxyl radical. The resulting copolymeric organopolysiloxane of this invention had SiOH=0.30%, SiH=0.50% and a viscosity of 71 Pa·s. It provided smooth adhesive release at high release force for a silicone paper-coating composition when mixed therewith. The gel-permeation chromatograms of the sole drawing in this disclosure were derived from this preparation.

EXAMPLE 5

The preparation described in Example 2 was repeated except that 40 parts of Fluid B-1 and 89.1 parts of Resin A-3 (60 parts of resinous copolymeric siloxane and 29.1 parts of xylene) were mixed to form a homogeneous mixture having 2.9 silicon-bonded hydrogen radicals for every silicon-bonded hydroxyl radical. The resulting copolymeric organopolysiloxane of this invention had SiOH=1.64%, SiH=0.002%, A.N.=0.95 and a viscosity of 77.5 Pa·s. It was useful as a controlled release additive for a platinum-catalyzed curable silicone paper coating composition for releasing agrressive acrylic adhesive.

EXAMPLE 6

The preparation described in Example 2 was repeated except that 600 parts of Fluid B-4 and 1331 parts of Resin A-5 (900 parts of resinous copolymeric siloxane and 431 parts of xylene) were mixed to form a homogeneous mixture. During the heating of this mixture pressure was reduced at 98° C. after 45 minutes of heating and was gradually reduced thereafter over a period of 85 minutes as the temperature was increased to 150° C. The resulting copolymeric organosiloxane of this invention had SiOH=1.78%, SiH=0.02%, A.N.=1.4, N.V.C.=98.8% and a viscosity of 354 Pa·s. It was useful as a strengthening component for a tin-catalyzed curable silicone mold coating for releasing molded polyurethane foam articles.

That which is claimed is:

1. A method for preparing a liquid copolymeric organopolysiloxane, said method comprising
   (A) forming a homogeneous mixture having an acid number greater than zero and comprising
      (a) an organic solvent solution of a resinous copolymeric siloxane containing silicon-bonded hydroxyl radicals and consisting essentially of $R_3SiO_{1/2}$ siloxane units and $SiO_{4/2}$ siloxane units wherein the ratio of the number of said $R_3SiO_{1/2}$ siloxane units to the number of said $SiO_{4/2}$ siloxane units has a value of from 0.6/1 to 0.9/1 and each R denotes, independently, a monovalent hydrocarbon radical and
      (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and
   (B) heating said homogeneous mixture to remove substantially all of said organic solvent therefrom.

2. A method according to claim 1 wherein the homogeneous mixture is sufficiently acidic to provide an acid number of from 0.1 to 1 for the homogeneous mixture, extrapolated to the solvent-free state.

3. A method according to claim 2 wherein the ratio of the total number of silicon-bonded hydrogen atoms in component (b) to the total number of silicon-bonded hydroxyl radicals in component (a) has a value of at least about 2.

4. A method according to claim 1, 2 or 3 wherein the resinous copolymeric siloxane consists of $(CH_3)_3SiO_{1/2}$ siloxane units and $SiO_{4/2}$ siloxane units and has a silicon-bonded hydroxy content of from 1 to 5 percent by weight and an acid number of from 0.3 to 1.4.

5. A method according to claim 4 wherein the organohydrogenpolysiloxane has the formula $(R'')(CH_3)_2SiO\{(CH_3)_2SiO\}_a\{(CH_3)(H)SiO\}_b$-$Si(CH_3)_2(R'')$ wherein each R'' denotes, independently, a methyl radical or a hydrogen radical and a and b denote numbers, each having an average value of zero or more.

6. A method according to claim 5 wherein the organohydrogenpolysiloxane has the formula $(CH_3)_3SiO\{(CH_3)(H)SiO\}_bSi(CH_3)_3$ wherein b has an average value of from 30 to 70.

7. A method according to claim 6 wherein the homogeneous mixture contains from 40 to 60 parts by weight of resinous copolymeric siloxane and from 40 to 60 parts by weight of organohydrogenpolysiloxane.

8. A copolymeric organopolysiloxane prepared by the method of claims 1, 2, or 3.

9. A copolymeric organopolysiloxane prepared by the method of claim 4.

10. A copolymeric organopolysiloxane prepared by the method of claim 5.

11. A copolymeric organopolysiloxane prepared by the method of claim 6.

12. A copolymeric organopolysiloxane prepared by the method of claim 7.

* * * * *